United States Patent
Gergek (12)

(10) Patent No.: US 6,568,425 B2
(45) Date of Patent: May 27, 2003

(54) REMOTE CONTROLLED WATER FLOW AND DRAIN SYSTEM

(76) Inventor: Franc Gergek, 55 West Beaver Creek Road, Unit 14, Richmond Hill, Ontario (CA), L4B 1K5

( * ) Notice: Subject to any disclaimer, the term of this patent is extended or adjusted under 35 U.S.C. 154(b) by 0 days.

(21) Appl. No.: 10/093,509

(22) Filed: Mar. 11, 2002

(65) Prior Publication Data

US 2002/0088176 A1 Jul. 11, 2002

Related U.S. Application Data

(63) Continuation-in-part of application No. 09/945,620, filed on Sep. 5, 2001.
(60) Provisional application No. 60/229,594, filed on Sep. 5, 2000.

(51) Int. Cl.[7] .............................................. F16K 49/00
(52) U.S. Cl. ............................ 137/565.16; 137/561 A; 417/44.1; 417/326; 47/79
(58) Field of Search .................. 137/565.16, 561 R, 137/561 A; 417/44.1, 326; 47/79

(56) References Cited

U.S. PATENT DOCUMENTS

| | | | | |
|---|---|---|---|---|
| 2,894,384 A | * | 7/1959 | Smith ..................... | 137/565.16 |
| 3,304,564 A | | 2/1967 | Green et al. | |
| 4,194,691 A | * | 3/1980 | Birnbach et al. ............. | 239/63 |
| 4,610,784 A | | 9/1986 | Reyniers ..................... | 210/169 |
| 4,838,310 A | | 6/1989 | Scott et al. | |
| 4,909,435 A | | 3/1990 | Kidouchi et al. | |
| 4,934,096 A | * | 6/1990 | Bentvelsen ................. | 47/62 N |
| 5,095,945 A | | 3/1992 | Jensen | |
| 5,170,361 A | | 12/1992 | Reed | |
| 5,584,320 A | * | 12/1996 | Skinkle et al. ............... | 137/565 |
| 5,695,654 A | | 12/1997 | Schultz ........................ | 210/780 |
| 5,775,372 A | | 7/1998 | Houlihan | |
| 5,813,655 A | | 9/1998 | Pinchott et al. | |
| 5,927,332 A | | 7/1999 | Richard | |
| 5,966,864 A | | 10/1999 | Flink .......................... | 47/40.5 |
| 5,979,776 A | | 11/1999 | Williams | |
| 6,039,067 A | | 3/2000 | Houlihan | |

* cited by examiner

Primary Examiner—A. Michael Chambers
(74) Attorney, Agent, or Firm—Wayne H. Van; Ogilvy Renault

(57) ABSTRACT

A method for supplying and withdrawing water to and from a user apparatus is achieved by supplying and withdrawing water through a single water pipe during different periods of time. A remote controlled water flow and drain system for implementation of this water supply and withdrawal method includes a water passage having two ends, one being use with the user apparatus such as a plant pot, and the other being connected to a reversible pump, and is controlled by a main controller, preferably in combination with a remote controller. The system can be connected to both a water source and a place for drainage, selectively communicating with the water source to supply water through the water passage to the user apparatus at one time, and at another time communicating the place for drainage to withdraw water from the user apparatus and deliver the withdrawn water to the place for drainage. In various embodiments and applications of the invention, the system can be made as a central system in a house, an attachable system, or a portable system. The entire operation can be fully programmed.

18 Claims, 11 Drawing Sheets

REMOTE CONTROLLED WATER FLOW AND DRAIN SYSTEM

CROSS-REFERENCE TO RELATED APPLICATIONS

This patent application is a Continuation in Part of Applicant's co-pending U.S. patent application Ser. No. 09/945,620, filed Sep. 5, 2001 which claims the benefit of Applicant's U.S. provisional patent application serial No. 60/229,594 filed on Sep. 5, 2000.

FIELD OF THE INVENTION

The present invention relates to a water supply method, more particularly, to a method of controllably supplying water to an apparatus and withdrawing water from the apparatus, and a remote controlled water flow and drain system which implements the method.

BACKGROUND OF THE INVENTION

Various water supply systems have been developed for different purposes. For example, water temperature and flow rate control is used in hot water supply systems, particularly to a bathtub such as is described in U.S. Pat. No. 4,909,435, issued to Kidouchi et al. on May 20, 1990. Kidouchi et al. describe a hot water supply system having a remote water flow control. The hot water supply system includes a water hose, one end of which is connected to a device that can controllably mix hot and cold water to supply water at various temperatures and various rates through the hose, to a user at the other end of the water hose. The hot water supply system also has a draining function, and the water drainage is achieved through a drainage pipe of the bathtub under water gravity. A drainage cock confirmation switch is used in receiving a signal from the remote water flow control in order to open and close the drainage cock of the bathtub.

Another type of water supply and withdrawal system is well known in use with floor cleaning devices for recycling cleaning fluids. In such systems, known as continuous flow recycling, a liquid cleaning solution is sprayed toward the surface being cleaned and simultaneously a vacuum source creates a high velocity air stream that draws the atomized liquid toward the surface, along the surface, or into the material in the case of carpeting, and then upwardly away from the surface. This procedure extracts soil, debris and other foreign matter from the floor surface along with the cleaning solution. One example of such systems is described in U.S. Pat. No. 4,083,077, issued to Knight et al. on Apr. 11, 1978. Knight et al. describe a hand tool which is constructed for detachable connection to a fluid cleaning machine such as a steam cleaning unit. A hollow head of the hand tool has forward and rearward regions forming a suction chamber and a spray chamber respectively. A fluid solution line is surrounded and protected by a flexible suction hose that is releasably coupled to a neck of the hand tool. A flow control interconnects the fluid solution line and a spray nozzle. Knight et al.'s fluid cleaning machine also includes a dispensing tank which holds a special fluid solution for cleaning fabrics, carpets and the like and consists of water and various agents for cleaning, deodorizing, etc. A recovery tank eventually collects used fluid solution and entrained dirt, debris, etc. One side of the steam cleaning machine is equipped with a switch and a control panel that may be activated when an electrical cord is coupled to an electrical outlet. The flexible fluid solution line and the surrounded flexible vacuum hose connect the hand tool to the steam cleaning machine.

These water supplying systems of the prior art are generally designed for specific purposes and generally speaking, cannot be used in different applications. For example, the Kidouchi et al.'s water supplying system cannot withdraw used water from a tank which does not have its own drainage outlet and pipe. Knight et al.'s water supply and withdrawal system is not adapted to supply water in requested volume to fill a container and then withdraw water in a requested volume from the container, respectively. Therefore, there is a need for a system of supplying and withdrawing water in order to overcome the shortcomings of the water supplying systems of the prior art.

SUMMARY OF THE INVENTION

It is one object of the present invention to provide a method and system of supplying and withdrawing water in a required amount.

In general, the present invention provides a method of supplying and withdrawing water comprising steps of supplying water to an apparatus and withdrawing water from the apparatus in required amounts through a single water pipe. The supplying of water and the withdrawing of water through the single water pipe is controlled in a required sequence.

It is preferably to switch water communication modes of the water pipe at a distal end thereof relative to the apparatus, between a first water communication mode in which the water pipe is in fluid communication with a water source, and a second water communication mode in which the water pipe is in fluid communication with a place for water drainage. The switching of water communication modes of the water pipe between the first and second water communication modes is preferably in response to signals sent from a controller positioned in the proximity of the apparatus, or from sensors associated with the apparatus.

It is also preferable to supply water or withdraw water by use of means positioned at the distal end of the water pipe for generating a fluid pressure differential within the water pipe between an end of the water pipe at the apparatus and the distal end of the water pipe. The generation of the fluid pressure differential in the water pipe is preferably alternated between a first fluid pressure mode for supplying water to the apparatus and a second fluid pressure mode for withdrawing water from the apparatus, in response to signals sent from a controller positioned in the proximity of the apparatus, or in response to signals sent from sensors associated with the apparatus.

In accordance with one aspect of the present invention, a water flow and drain system is provided for supplying and withdrawing water. In the system a water passage is provided and a first end of the water passage is adapted for use with an apparatus which water is supplied to and withdrawn from. Means, such as a pump with a reversible electric motor coupled therewith, is connected with a second end of the water passage for generating a fluid pressure differential in the water passage between the first and second ends thereof. Also provided are means for establishing fluid communication of the water passage with a water source, or a place for water drainage in order to supply or withdraw water through the water passage, to or from the apparatus during different periods of time. The means of establishing water communications, preferably a valve and pipe sub-system, is connected with, for example, the pump with the reversible electric motor.

In one embodiment of the present invention, the system includes a main controller associated with, for example, the pump with the electric motor and the valve and pipe subsystem, in order to control the operation of the water supply and withdrawal. A remote controller, and sensors associated with the apparatus are provided so that the main controller controls the operation of the water supply and withdrawal in response to the signals from the remote controller and the sensors. The system includes at least one section of the water passage which is a flexible water pipe. A first end of the water pipe defines the first end of the water passage, being adapted for use with the apparatus.

The system according to another embodiment of the present invention further includes a plurality of water pipe sections connected together to form a water distribution net. The water distribution net includes one opening defining the second end of the water passage which is connected, for example, to the pump with the reversible electric motor, and a plurality of other openings to be selectively connected to the flexible water pipe so that a branch of the water distribution net between the one opening connected to the pump and the selected opening connected with the flexible pipe, together with the flexible pipe defines the water passage when the remaining openings of the water distribution net are closed. Therefore, water can be supplied to and withdrawn from one of a plurality of apparatus when these apparatus are selectively connected one at a time, to the respective openings of the distribution net. These apparatus can be positioned in various locations, and each can be connected to a nearest one opening of the distribution net.

A similar system of supplying and withdrawing water is described in Applicant's co-pending U.S. patent application Ser. No. 09/945,620, the entire specification of which is incorporated herein by reference. Nevertheless, the system of supplying and withdrawing water described in U.S. patent application Ser. No. 09/945,620 is limited to use with a plant pot for watering potted plants, which however, is only one of possible applications of the water flow and drain system according to the present invention.

In accordance with another aspect of the present invention, a water flow and drain device is provided for supplying and withdrawing water to and from an apparatus. The device comprises a container including a first compartment for containing source water, usually fresh water, and a second compartment for collecting used water. A pump is provided in selected fluid communication with one of the first and second compartments, and is coupled with a reversible electric motor. The device is provided with a pipe having a first end connected to the pump and a second end adapted for use with the apparatus. Means for controlling the selective fluid communication of the pump with one of the first and second compartments, and controlling the electric motor in operation is provided, whereby the electric motor drives the pump in either direction as required, in order to supply source water from the first compartment to the apparatus, or to withdraw used water from the apparatus and deliver the used water into the second compartment. The device according to one embodiment of the present invention is made in a portable style and the container includes a tip safety valve permitting air to pass therethrough while inhibiting water spillage when the container tips on one side thereof.

The present invention provides a novel method of supplying and withdrawing water which can be used in various applications, and a water flow and drain system which implements the method. The advantages and features of the present invention will be better understood with reference to the preferred embodiments of the present invention described hereinafter.

BRIEF DESCRIPTION OF THE DRAWINGS

Having thus generally described the nature of the present invention, reference will now be made to the accompanying drawings, showing by way of illustration the preferred embodiments thereof, in which:

FIG. 3b is a cross-sectional view of a schematic illustration, showing the method of the present invention used for withdrawing excessive water from the tray illustrated in FIG. 3a;

DETAILED DESCRIPTION OF THE PREFERRED EMBODIMENTS

Figure 1:
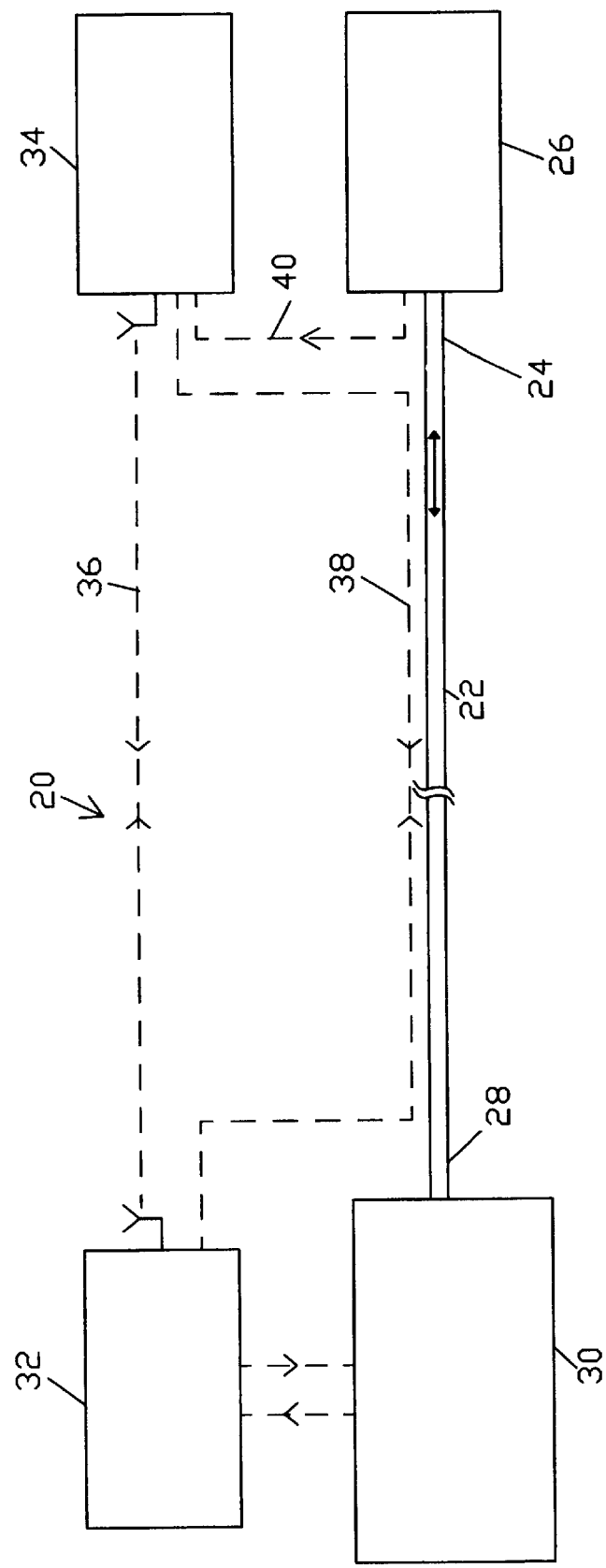
FIG. 1 is a simplified diagram illustrating a method of supplying and withdrawing water according to the present invention.

With reference to the drawings, particularly FIG. 1, a water flow and drain system for supplying and withdrawing water, illustrated in principle and generally indicated at numeral 20 includes a single water pipe 22. One end 24 of the water pipe 22 is adapted for use with a user apparatus 26 for supplying water thereto or withdrawing water therefrom. A distal end 28 of the water pipe 22 relative to the user apparatus 26 is connected to a hydro-electrical system 30 which also includes a water source and a place for water drainage. The hydro-electrical system 30 is electrically connected to a main controller 32 so that water can be supplied to the user apparatus 26 and can be withdrawn from the user apparatus 26 in a required amount through the single water pipe 22, during different periods of time. During operation, the main controller 32 signals the hydro-electrical system 30 to switch water communication modes of the water pipe 22 at the distal end 28, between a first water communication mode and a second water communication mode. In the first water communication mode, the water pipe 22 is in fluid communication with a water source and in the second water communication mode, the water pipe 22 is in fluid communication with the place for water drainage. The main controller 32 also signals the hydro-electrical system 30 to generate a fluid pressure differential, for example by means of a pump coupled with a reversible electric motor, within the water pipe 22 between the two ends 24 and 28, to cause water to flow in the pipe 22 in either direction. The water pressure modes can be alternated between the supplying of water and the withdrawing of water by reversing the electric motor which is controlled by the main controller 32. The pump coupled with the reversible electric motor can be replaced by two pumps provided in the hydro-electrical system 30, one of which pumps water through the water pipe 22 into the user apparatus 26 and the other which sucks water out of the user apparatus 26 through the water pipe 22 and delivers the water into the place for water drainage. These two pumps are also controlled by the main controller 32.

The main controller 32 can be manually operated to signal the hydro-electrical system 30 to supply water from the water source to the user apparatus 26 in a required amount at one time, and to signal the hydro-electrical system 30 to withdraw a required amount of water from the user apparatus 26 and deliver the required amount of water to the place for drainage at another time. However, this operation can also be done automatically by the main controller 32 in response to signals sent from a remote controller 34 which is positioned in the proximity of the user apparatus 26. The remote controller 34 can be electronically connected to the main controller 32 either wirelessly, as shown by broken line 36 or through cable connection as shown by broken line 38. The main controller 32 may also receive signals from sensors (not shown) associated with the user apparatus 26 through wires as shown by broken line 40, connected to the user apparatus 26. The cable 38 and the wire 40 can be connected to each other directly without passing through the remote controller 34. In such an arrangement, the water supply and withdrawal process can be manually initiated at the remote controller 34 and automatically conducted step-by-step in response to the signals sent from the sensors of the user apparatus 26 according to predetermined programming stored in either the main controller 32 or the remote controller 34, until the process is completed.

In order to understand the complexity of the requirements for the method of supplying and withdrawing water according to the present invention and in order to illustrate various applications of the present invention, different types of user apparatus are described below. It is noted that similar numerals are used to indicate similar components and features of the present invention in different figures of the drawings according to various applications and embodiments of the present invention. Therefore, the similar components and features will not be redundantly described.

Figure 2:
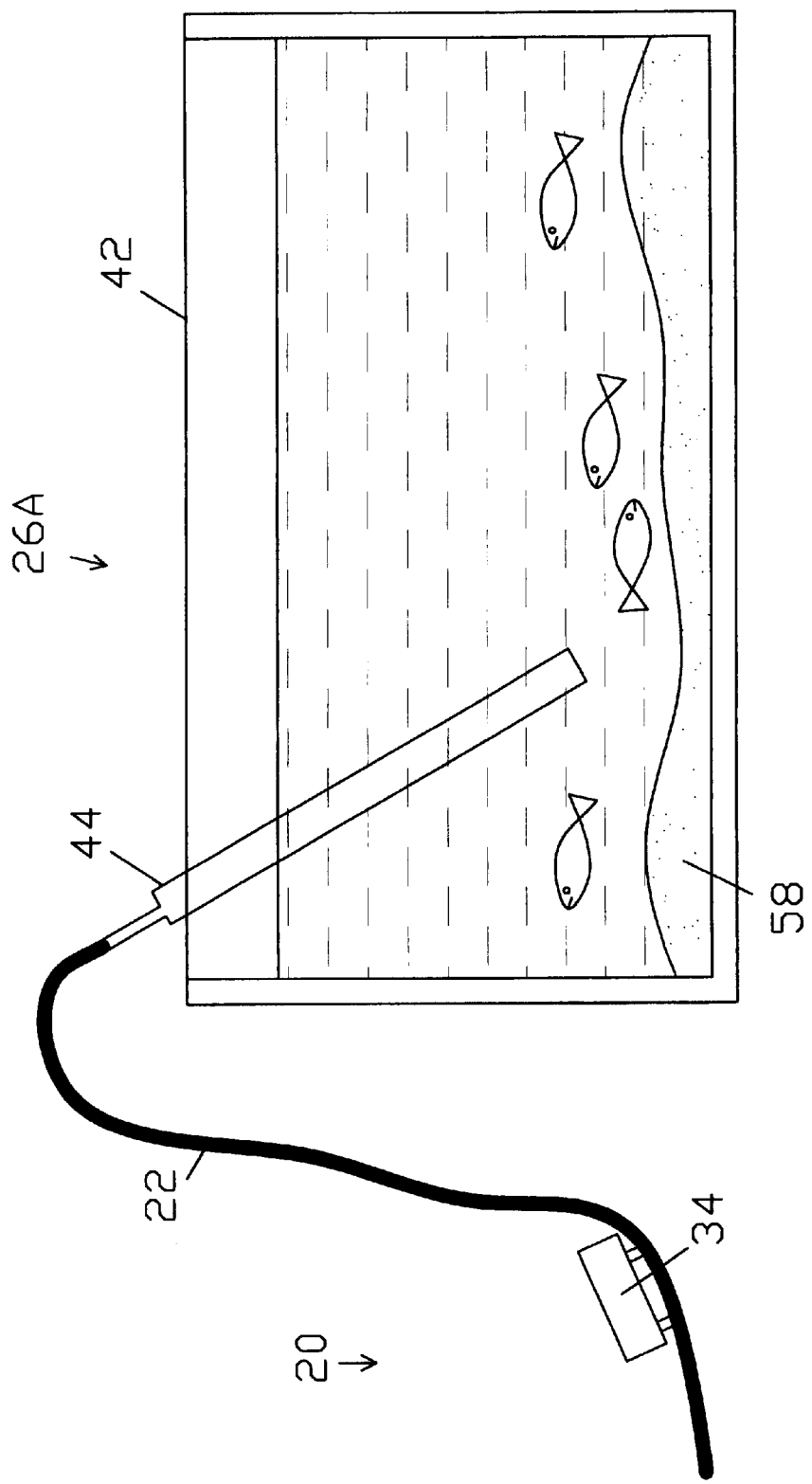
FIG. 2 is a schematic view illustrating one application of the present invention in which the method of the present invention is used for changing the water of a fish tank.

FIG. 2 illustrates a user apparatus 26A which is an aquarium 42 to be cleaned with a suction tube 44 attached to the pipe 22 of the water flow and drain system 20. The water flow and drain system 20 must be programmed when the aquarium 42 is serviced by the system 20 for the first time.

Figure 4:
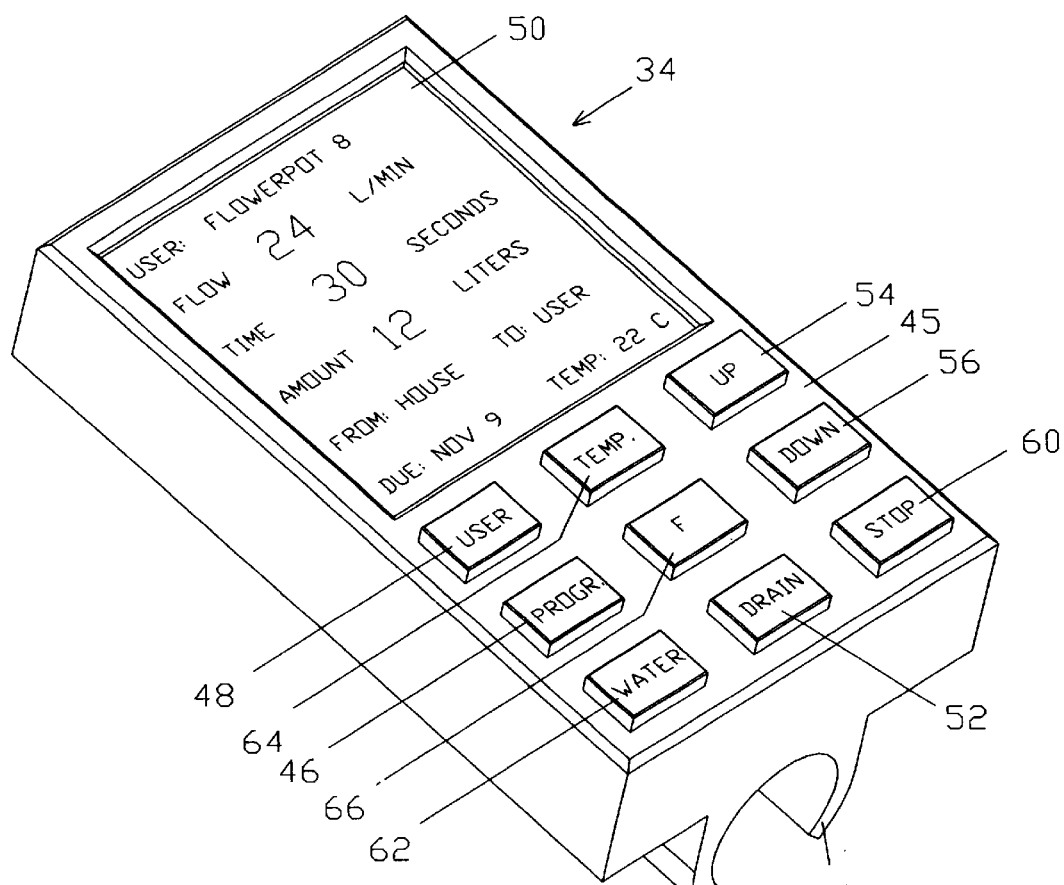
FIG. 4 is a perspective view of a remote controller which is used in one embodiment of the present invention.

With reference to FIGS. 1 and 4, the programming can be conducted using the remote controller 34 which is illustrated in detail in FIG. 4. In order to program the cleaning process of the aquarium 42, key 46 for "Program" on the keyboard 45 of the remote controller 34 is pressed, and then key 48 for "User" is repeatedly pressed until "Aquarium" is displayed on the display panel 50 of the remote controller 34. If more than one aquarium is serviced by the system 20, then the remote controller 34 will display a user apparatus name and designator, such as "Aquarium 2". The main controller 32 creates a file with the name "Aquarium". The suction tube 44 is then inserted into the water in aquarium 42 and key 52 on the keyboard 45 of the remote controller 34 is pressed to begin withdrawing water from the aquarium 42. The hydro-electrical system 30 creates vacuum in the pipe 22 and the water is withdrawn from the aquarium 42 through the end of the suction tube 44 when the main controller 32 actuates the hydro-electrical system 30 in response to a withdrawing signal sent from the remote control 34 by pressing key 52 for "Drain". The withdrawal rate can be adjusted using keys 54, 56 for "Up" and "Down" on the keyboard 45 of the remote controller 34. A properly selected withdrawal rate lifts sediments from the gravel 58 in the bottom of the aquarium 42, along with the water being withdrawn, but will not substantially disturb the gravel 58.

When a required amount of water has been withdrawn from the aquarium 42, key 60 on the key board 45 of the remote controller 34 is pressed to terminate the water withdrawal session. Alternatively, the suction pipe 44 can simply be removed from the water in the aquarium 42 to cause the termination of the water withdrawal session. The water flow meter in the hydro-electrical system detects no more water and sends a signal to the main controller 32 which will turn off the vacuum in the water pipe 22 after several seconds.

The amount of water that has been withdrawn from the aquarium 42 and the withdrawal rate are stored in the file created in the main controller 32 for that particular aquarium 42.

In order to begin refilling the aquarium 42 after the aquarium 42 is cleaned, key 62 for "Water" is pressed to actuate the hydro-electrical system 30 to supply a requested amount of fresh water to the aquarium 42 at a selected temperature which can be adjusted by pressing key 64 for "Temperature" on the key board 45 of the remote controller 34, and a water flow is set to maximum, according to data now stored in the file. When a change of the water flow rate is desired, keys 54 and 56 for "Up" and "Down" can be pressed to adjust the water flow rate. The water supply session is completed and terminated when the same amount of water as was withdrawn from the aquarium 42 has been supplied to the aquarium 42. The adjusted data of flow rate is stored in that aquarium file.

Before closing this first operation, the remote controller 34 will request, through its display panel 50, an alarm input data, and then a due date for the next cleaning operation can be input in order to set up the alarm. The files of all the user apparatus stored in the main controller 32 are monitored daily. The main controller 32 of the system 20 will generate an alarm in the form of a buzzer or light when any of the user apparatus has an expired servicing period.

Once a file for the particular user apparatus which is the aquarium 42 in this application, has been stored in the main controller 32 of the system 20, the water flow and drain system 20 can be used automatically in future cleaning operations of the aquarium 42. In order to start the automatic operation, the aquarium 42 is selected as the user apparatus by pressing key 48 for "User" on the key board 45 of the remote controller 34, and then key 52 for "Drain" is pressed.

The suction tube 44 is inserted into the aquarium 42 to withdraw water from the aquarium 42 along with the sediments on the gravel 58. The water with the sediments is being withdrawn from the aquarium 42 at the preprogrammed withdrawal rate and the water withdrawal session will be automatically turned off when the amount of water withdrawn from the aquarium 42 reaches the volume according to the data stored in that aquarium file. After a predetermined short period of time, fresh water will be supplied automatically at the temperature and rate stored in the file. The predetermined short period of time between the water withdrawal session and water supply session can be adjusted, for example, by pressing a function key 66 on the key board 45 of the remote controller 34 when programming is conducted. The water flow and drain system 20 will be turned off automatically by the main controller 32 when the required amount of water according to data stored in that file of the main controller 32 is replenished.

It is noted that the remote controller 34 is provided with a pair of gripping members 68 at the back of the remote controller 34 which provides the convenience of allowing the remote controller 34 to be detachably attached to the flexible water pipe 22 at any location along its length.

Figure 3:
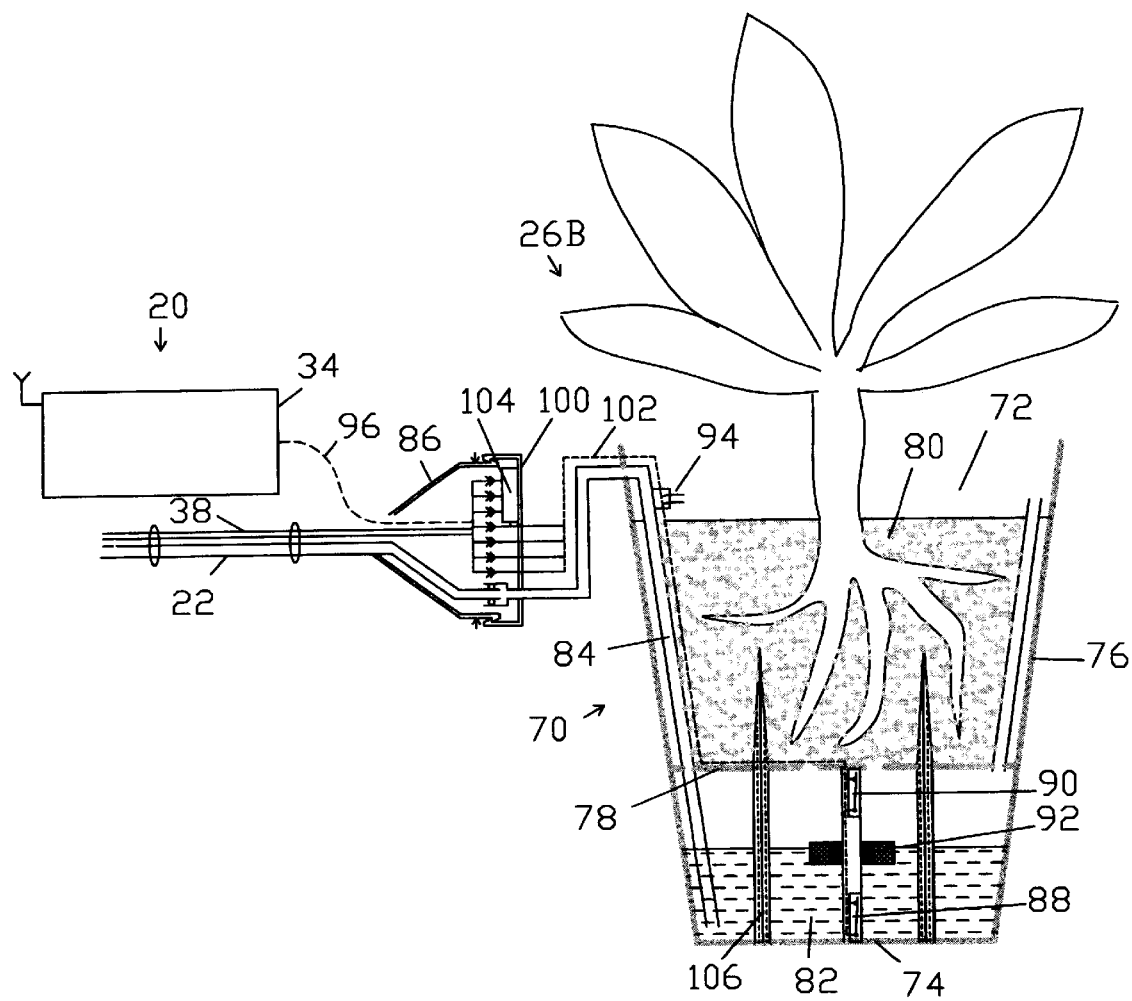
FIG. 3 is a schematic view illustrating another application of the present invention in which the method of the present invention is to be used for watering potted plants according to one embodiment of the present invention.

With reference to FIGS. 1 and 3, another application of the water flow and drain system 20 is described below. In this application, a user apparatus 26B used with the water flow and drain system 20 is a plant pot 70 prepared for automatic watering with a reservoir 82 for water storage in order to extend the time between waterings. This application is developed from a method of watering a plant having roots in soil contained in a pot without drainage holes, which is described in Applicant's U.S. patent application Ser. No. 09/945,620. The method described in that United States patent application includes steps of introducing water under pressure into a bottom of the pot through a water passage formed with water-impermeable material, extending from the bottom of the pot upwardly and out of the pot, until a top portion of the soil in the pot is flooded with water; and then removing a portion of water not absorbed by the soil from the pot through the same passage. A space is preferably provided between the bottom of the pot and a bottom portion of the soil, the space being adapted for collecting water drained from the soil and being in fluid communication with the passage.

The plant pot 70 includes an open top 72, a closed bottom 74 and a side wall 76 which extends between the top 72 and bottom 74 in a truncated conical shape. A perforated separating wall 78 divides the plant pot 70 into an upper portion and a lower portion. The upper portion is used for containing soil 80 in which the roots of the plant are buried. The lower portion is formed as the reservoir 82 for containing water in the plant pot 70. The perforated separating wall 78 permits water to freely pass therethrough, either downwardly or upwardly, while inhibiting soil particulates from falling into the reservoir 82. A tube 84 extends from the reservoir 82 in proximity to the bottom 74 of the plant pot 70, passing through the perforated separating wall 78 and extending upwardly along the side wall 76. An upper end of the tube 84 extends out of the open top 72 of the plant pot 70 connects to the water pipe 22 of the water flow and drain system 20 by means of a hydro-electrical connector 86 of the water flow and drain system 20 and a hydro-electrical socket 100 of the plant pot 70.

Switches 88 and 90 are positioned at the top and the bottom of the reservoir 82 respectively, and each of them is activated by a float member 92. A water level detector 94 is positioned at the top of soil 80 in the plant pot 70 and is activated by contacting water. The switches 88, 90 and the detector 94 which function as water level sensors are connected through a cable 102, the hydro-electrical connector 86 and a cable 96, to the remote controller 34.

The hydro-electrical connector 86 is connected to the flexible water pipe 22 and the signal conductors 38 which could be optical fibers, depending on the types of sensors used with the apparatus 26. However, in this embodiment of the present invention, the conductors 38 are electrical wires. The electrical wires 38 are preferably incorporated into the wall of the flexible water pipe 22 so that the electrical wires 38 are protected and can be conveniently moved together with the flexible water pipe 22. The hydro-electrical socket 100 is connected to the outer end of the tube 84 and wires 102 which electronically connect with the respective sensors 88, 90 and 94. The cable 96 between the remote controller 34 and the hydro-electrical connector 86 is optional because the remoter controller 34 is wirelessly connected to the main controller 32 which is in turn connected to the hydro-electrical connector 86 through the electrical wires 38. When the hydro-electrical connector 86 and the hydro-electrical socket 100 are attached together, the cable 102 is connected to the respective cable 96 and wires 38 by means of metal contacts (not indicated) and the tube 84 is connected in fluid communication with the pipe 22.

The hydro-electrical socket 100 includes a memory chip 104. The data of memory chip 104 can be read by the remote controller 34 directly, or through the main controller 32, but cannot be changed by the remote controller 34. The memory chip 104 is programmed for the particular plant pot 70 and contains an identification number which is preferably a randomly selected high digit number, as well as the code which includes all other data required for automatic watering.

When the hydro-electrical connector and socket 86, 100 are connected together for the first time, the identification number stored in the memory chip 104 is either read by the remote controller 34 and sent to the main controller 32, or is directly read by the main controller 32. The main controller 32 compares that number with the other identification numbers stored in the system 20 and because that read identification number cannot match any one of the identification numbers already stored in the system 20, then proceeds to create a new file for the read identification number of user apparatus 26B. The main controller 32 determines a default number for the plant pot 70, such as "Flower Pot 8" to be displayed on the display panel 50 of the remote controller 34 (see FIG. 4). The displayed default number for the plant pot 70 can be changed, if desired. It is then advised to attach a sticker or flag (not shown) to plant pot 70 indicating the number, character and/or name assigned to that particular plant pot 70. Other data in the memory chip 104 is now stored in the file created with the particular identification number of the plant pot 70.

The water supply and withdrawal process can be initiated manually or automatically, because the main controller 32 applies the pre-programmed sequence with the parameters that were read from the memory chip 104, after the water flow and drain system 20 is connected with the plant pot 70. After the water supply and withdrawal process is initiated, the main controller 32 turns on the water flow at the pre-set rate through the flexible water pipe 22, to water the potted plant using the flood and drain watering method. The water is introduced through the tube 84 into the reservoir 82 of the plant pot 70. The water flow rate is reduced when the float member 92 is raised by the water in the reservoir 82 to activate the switch 90 at the top of the reservoir 82. Water is then continuously supplied at the reduced rate through the tube 84 into the plant pot 70, to flood the soil 80 with water. The water supply to the plant pot 70 is turned off when the water level detector 94 detects water and sends a signal to the water flow and drain system 20.

Several seconds after the water supply to the plant pot 70 is turned off, the water flow and drain system 20 begins to withdraw water from the plant pot 70, through the flexible water pipe 22 and the tube 84. When the water level in plant pot 70 drops below the top of the reservoir 82 causing the float member 92 to deactivate the switch 90, the water flow and drain system 20 stops withdrawing water from the plant pot 70. Thus, the reservoir 82 of the plant pot 70 contains water to continue providing moisture to the soil 80 of the plant pot 70 for a period of time, by means of a plurality of wick members 106 which extend upwardly from the reservoir 82, across the perforated separating wall 78 and into a lower portion of the soil 80 contained in the upper portion of the plant pot 70.

The water supply and withdrawal procedure is observed during the initial procedure, and may be adjusted immediately or at any time, if desired. The adjusted value will then replace the predetermined parameters in the file for this particular apparatus 26B, the plant pot 70 in this application. The volume of water from the top level of the reservoir 82 at which the switch 90 is positioned, to the water level at the open end 72 of the plant pot 70 at which the water level detector 94 is positioned, is also measured and this data is recorded in the file of the main controller 32. This parameter of the water volume is later used as precautionary back-up data in case the water level detector 94 fails, so that the water flow and drain system 20 will automatically turn off the water supply when the pre-set water volume has been supplied after the switch 90 is activated, even though the water level detector 94 fails to send out a corresponding signal. The potential for water overflowing the plant pot 70 is thereby eliminated. A next planned service date can be input into the water flow and drain system 20 using the remote controller 34. The main controller 32 will then sense the alarm when the planned service date is reached.

In the next water supply and withdrawal service, the main controller 32 will recognize the deactivated status of switch 88 when the hydro-electrical connector and socket 86, 100 are connected together and the water remaining in the reservoir 82 maintains the float member 90 floating above the switch 88 at the bottom of the reservoir 82. This indicates that there is still water left in the reservoir 82 and the file for the plant pot 70 stored in the main controller 32 will be rewritten with a longer time interval between water supply and withdrawal service events.

Figure 3A:
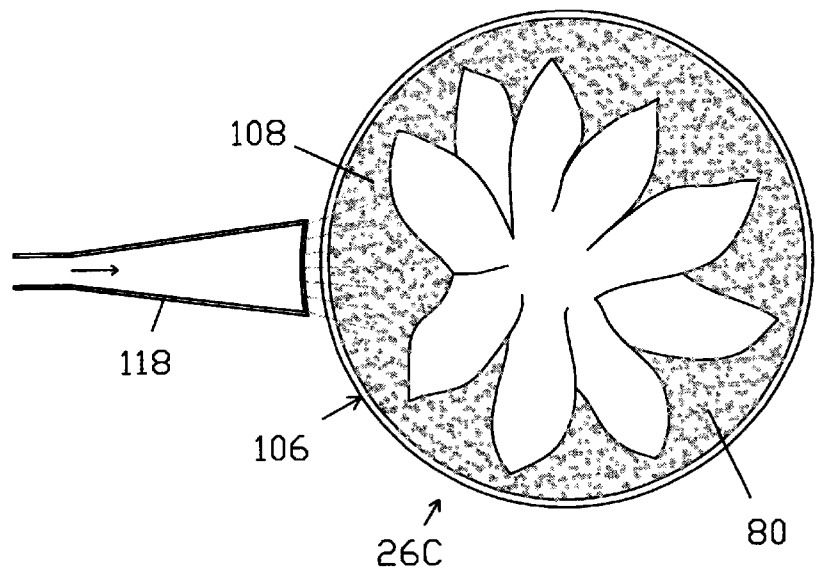
FIG. 3a is a top plan view of a schematic illustration, showing the method of the present invention used for watering potted plants according to another embodiment of the present invention.
Figure 3B:
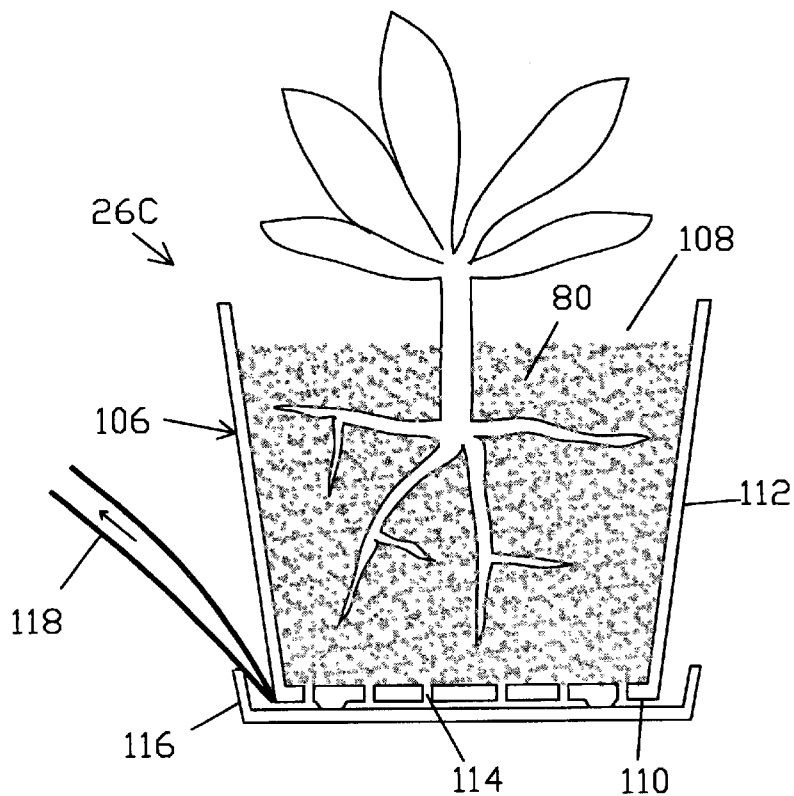

Reference is now made to FIGS. 1 and 3a, 3b. The water flow and drain system 20 can also be used to manually water potted plants. In a manual operation, the water flow and drain system 20 can be used to water plants growing in plant pots similar to the plant pot 70, which is specially designed for use with a bottom-up watering method, but can also be used to water plants growing in plant pots currently available on the market as shown in FIG. 3a and 3b. An apparatus 26C to be used with the water flow and drain system 20 includes a plant pot 106 with an open top 108, a closed bottom 110, and a side wall 112 which extends between the top and bottom in a truncated conical shape. A tray 116 is positioned under the bottom 110 of the plant pot 106 for collecting brown water drained from the soil 80 through one or more drain holes 114 in the closed bottom 110 of the plant pot 106.

Instead of the hydro-electrical connector 86 of FIG. 3, an adapter 118 having a flat outlet is connected to the flexible water pipe 22 of the water flow and drain system 20. In a manual operation, a water supply session is initiated manually with the remote controller 34 of the water flow and drain system 20. The adapter 118 is positioned above the open top 108 of the plant pot 106 so that water flow provided by the water flow and drain system 20 is delivered through the adapter 118 to the top of the soil 80. Water introduced into the plant pot 106 from the open top 108 thereof, spreads and is absorbed by the soil 80 while dropping down through the drain hole 114 and into the tray 116. Once brown water is observed in the tray 116, the water supply session of the water flow and drain system 20 is manually terminated immediately. It takes a short period of time for the tray 116 to collect all brown water drained from the soil 80 in the plant pot 106 and then, the flat outlet of the adapter 118 is placed into the brown water in the tray 116 in order to begin a water withdrawal session which is also manually activated using the remote controller 34 of the water flow and drain system 20. The water withdrawal session can be manually terminated using the remote controller 34 when there is no brown water left in the tray 116. Alternatively, the water flow and drain system 20 can automatically turn off when a no-water condition in the flexible water pipe 22 is detected.

The water withdrawal session may have to begin immediately after the water supply session is terminated if the water flow rate during the water supply session is relatively high and the brown water collected in the tray 116 rapidly increases to a level close to the top edge of the tray 116, in order to prevent water from overflowing the tray 116.

The applications described above with reference to FIGS. 2, 3, 3a, 3b are examples only of the use of the method and system of the present invention which is described with reference to FIG. 1. More applications which can be used with the present invention may be further recognized. For example, the water flow and drain system 20 of FIG. 1 can be used with a specially designed floor cleaning device which sprays water under pressure onto the floor surface for cleaning, and vacuums the brown water from the floor surface during different periods of time. The specially designed floor cleaning device is not part of this invention and will not therefore be further described.

Figure 5:
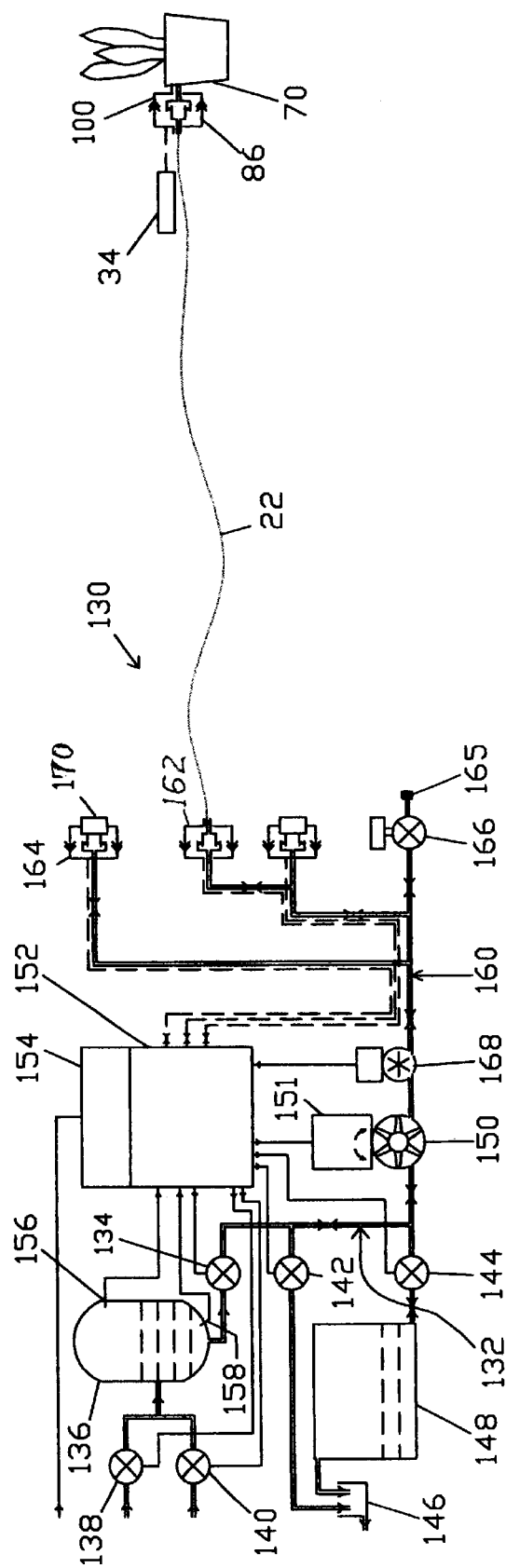
FIG. 5 is a schematic view of a central water flow and drain system according to a further embodiment of the present invention.

FIG. 5 illustrates a central water flow and drain system, generally indicated at numeral 130. The illustrated central water flow and drain system 130 is for use with a plurality of plant pots which are of the same type as plant pot 70 as described with reference to FIG. 3. It is understood that various apparatus can be used with the central water flow and drain system 130 in various applications as described above.

The central water flow and drain system 130 includes a main pipe system 132 which is preferably disposed, for example, in a basement of a house that is equipped with the water flow and drain system 130. The main pipe system 132 is connected through a solenoid valve 134 to a water supply source, in fluid communication. The water supply source is a low pressure water tank 136 connected through solenoid valves 138 and 140 to cold and hot water supply lines respectively. The main pipe system 132 is also connected through solenoid valves 142 and 144 to a draining inlet 146 directly, and indirectly by means of an auxiliary holding tank 148, respectively. The auxiliary holding tank 148 is optional. The main pipe system 132 is further connected to a pump 150 which is coupled to and adapted to be driven by a reversible electric motor 151. The low pressure water tank 136 is preferably placed in the basement and the auxiliary holding tank 148 may be placed outdoors.

A main controller unit 152 and a power supply unit 154 are also provided, preferably in the basement, and are connected to the electric system in the basement. The main controller unit 152 is electronically connected to the solenoid valves 134, 138, 140, 142 and 144. The main controller unit 152 is also electronically connected to the electric motor 151, and a pressure sensor 156 and a temperature sensor 158 which are both attached to the low pressure water tank 136 for measuring the inside pressure of the tank 136 and the water temperature, respectively.

The water flow and drain system 130 is provided with a water distribution net 160 comprising water pipe sections connected together. The water distribution net 160 is connected at its one opening to the pump 150, and is selectively connected at other openings to a flexible water pipe 22 by means of hydro-electrical connectors 162 which will be described in detail with reference to FIGS. 6 and 7 hereinafter. These openings of the water distribution net 160 for connecting the flexible water pipe 22, can be attached to indoor watering outlets 164 affixed in walls at various locations and on different floors of the house. The water distribution net 160 may further include one or more openings outside the house and is controlled by manual valves 166 for selectively connecting the flexible water pipe 22 outside the house. A water flow meter 168 is included in the water distribution net 160 proximate to the pump 150 so that water volume will be measured when water flows through the water distribution net 160, regardless of the selection of the outlets 164 for connecting the flexible water pipe 22.

The main controller unit 152 is electronically connected to the water flow meter 168 to receive electronic signals indicating the measured water flow volume. Electrical wires are also provided to connect the main controller unit 152 with the indoor watering outlets 164 at various locations and on different floors of the house, for transmitting electrical signals in both directions, which will be further described in detail below.

Figure 6:
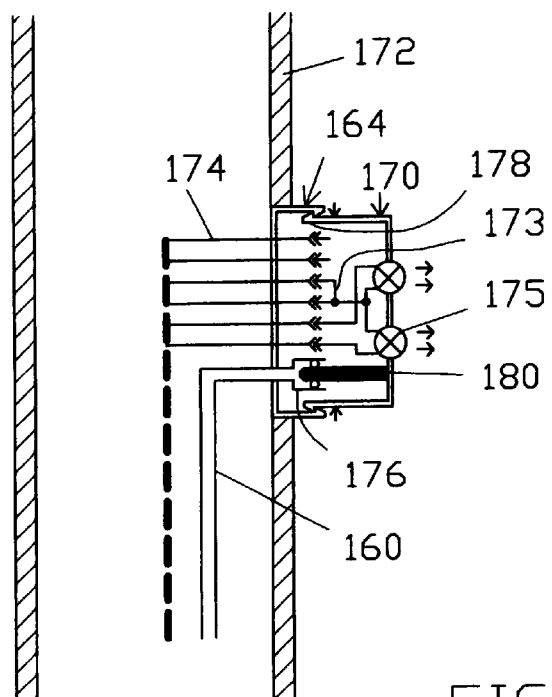
FIG. 6 is a schematic view illustrating a hydro-electrical connector with its indicator cover attached thereto.

In FIG. 6 the indoor watering outlet 164 is protected by a cover 170. The indoor watering outlet 164 is adapted to be affixed in an interior wall 172 and has a number of electrical contacts 174 which are connected through the wires to the main controller unit 152 of FIG. 5, and an opening 176 which is in fluid communication with one pipe section of the water distribution net 160. The cover 170 includes a mechanical interlocking member 178 to interlock with a corresponding part of the outlet 164 in order to prevent the cover 170 from being accidentally removed from the outlet 164. A plug 180 is provided with the cover 170 to sealingly close the opening 176 in order to prevent water leakage when the cover 170 is interlocked with the outlet 164 and the plug 180 is received in the opening 176. The cover 170 also includes a short circuit 173 and indicator lights 175 which are in electrical contact with corresponding contacts 174 of the outlet 164 when the cover 170 is secured to the outlet 164 so that the main controller unit 152 of FIG. 5 recognizes that the outlet 164 is not in use when this outlet 164 is covered. The indicator lights 175 may include an indicator for "System In Use" which is illuminated when the water flow and drain system 130 of FIG. 5 is in operation through another outlet 164, and an indicator for "Alarm" which will be illuminated when the due date for a watering operation is reached. An optional buzzer (not shown) can also be installed in the cover 170 to generate a sound alarm when the "Alarm" indicator is illuminated.

Figure 7:
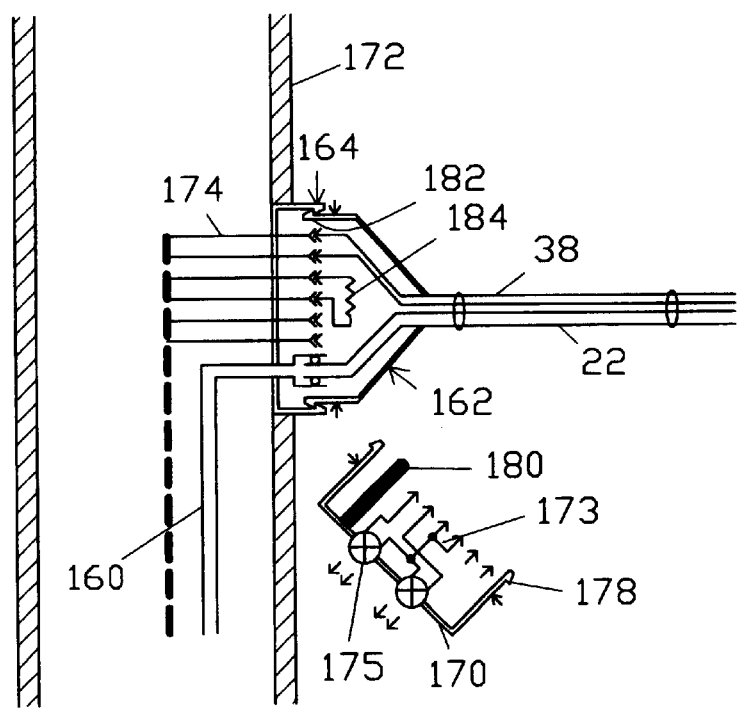
FIG. 7 is a schematic view illustrating the hydro-electrical connector of FIG. 6 with its indicator cover removed and being in a connected condition.

The cover 170 can be removed by squeezing and pulling it out. Once the cover 170 has been removed from the outlet 164, the flexible water pipe 22 can be attached to the outlet 164 through the hydro-electrical connector 162, as illustrated in FIG. 7. The hydro-electrical connector 162 has a mechanical interlocking member 182, similar to the mechanical interlocking member 178 of the cover 170, in order to interlock with the corresponding member of the outlet 164 so that the connector 162 can be releasably secured to the outlet 164. The hydro-electrical connector 162 is connected to one end of the flexible water pipe 22 which is not attached to the hydro-electrical connector 86, (see FIG. 5) and provides a water-tight connection of the flexible water pipe 22 with one pipe section of the water distribution net 160 when the hydro-electrical system connector 162 is secured to the outlet 164. The wires 38 incorporated with the flexible water pipe 22 are connected to contacts (not indicated) of the hydro-electrical connector 162 which provide electrical contact with contacts 174 of the outlet 164, when the hydro-electrical connector 162 is connected to the outlet 164 so that signals sent from the plant pot 70 of FIG. 5 are transmitted through this connection to the main controller unit 152 of FIG. 5. As an alternative to the short circuit 172 inside the cover 170, a resistor 184 is provided in the hydro-electrical connector 162 and is adapted to contact the contacts 174, which are included inside the outlet 164 and are designated for contact with the short circuit 172 of the cover 170. Thus, the main controller unit 152 (FIG. 5) can recognize that one of the outlets 164 is about to be used in an operation when the hydro-electrical connector 162 is connected to this particular outlet 164. The central water flow and drain system 130 of FIG. 5 is programmed to permit a watering operation only if the main controller unit 152 of FIG. 5 detects that one of the covers 170 is removed and the flexible water pipe 22 is connected to this particular outlet 164. Thus, the likelihood of operation by mistake is reduced and the risk of water spillage is thereby minimized.

Referring again to FIG. 5, the central water flow and drain system 130 can be used with an outdoor outlet 165 which includes a threaded faucet for connection. A water hose with a conventional connector can be connected to the conventional threaded faucet of the outdoor outlet 165. In order to operate an outdoor operation, the key 48 for "User" on the keyboard 45 of the remote controller 34 of FIG. 4 must be pressed to select the outdoor operation. Once the outdoor operation is selected, the water supply and withdrawal operation can only be initiated when all indoor outlets 164 are covered. The valve 166 must be manually opened at the beginning of the outdoor operation and manually closed after the outdoor operation is completed. The water supply and withdrawal sessions of the outdoor operation are also manually operated.

In this embodiment of the present invention the central water flow and drain system 130 uses a low pressure water tank 136 to automatically prime the pump 150 by momentarily turning on solenoid valve 134 because most pumps will not run properly or will be damaged if operated when dry. The pressure sensor 156 measures the interior pressure of the low pressure water tank 136 and the temperature sensor 158 measures the the water temperature inside the low pressure water tank 136. The main controller unit 152 operates the solenoid valves 134, 138, 140 and 142 to ensure that the water temperature is correct and the tank pressure is within the required limits according to the file in the main controller unit 152. If for example, the water temperature is too low, the main controller unit 152 signals solenoid valve 140 to open which allows hot water to flow into the low pressure water tank 136. If the low pressure water tank 136 is already full and the temperature is still too low, the main controller unit 152 signals the solenoid valve 140 to close and then signals the solenoid valves 134 and 142 to open in order to drain a required amount of water from the the low pressure water tank 136, and then the main controller unit 152 signals solenoid valves 134 and 142 to close and solenoid valve 140 to reopen in order to supply more hot water.

When a water supply session is initiated by using the remote controller 34 which is attached to the flexible water pipe 22 at the end proximate to the plant pot 70, the solenoid valve 134 is signaled to open and the electric motor 151 starts driving the pump 150 to pump water from the low pressure water tank 136 to the plant pot 70. A branch of the water distribution net 160 between the pump 150 and the selected indoor outlet 164 which is connected with the flexible water pipe 22, and the flexible water pipe 22, together form a single water passage for supplying water to the plant pot 70 and withdrawing water from the plant pot 70. The water flow in the water supply session is measured by the water flow meter 168 and the information is transmitted to the main controller 152, which then signals the electric motor 151 to adjust its speed in order to ensure a requested flow rate.

In response to a stop signal received in the main controller unit 152, the electric motor 151, pump 150 and the solenoid valves 134, 138 and 140 are turned off. When a signal for draining is received in the main controller unit 152, either according to a programming sequence or a signal which is manually sent from the remote controller 34, the main controller unit 152 opens the solenoid valve 142 and starts the electric motor 151 to drive the pump 150 in a direction to withdraw water from the plant pot 70 through the single water passage which was used to supply water to the same plant pot 70. The water flow meter 168 measures the water draining flow rate and displays the value on the display panel of the remote controller 34. The water flow meter 168 can detect a no-water condition and display the "No-Water" message on the display panel of the remote controller 34 when there is no more water being withdrawn from the plant pot 70. The main controller unit 152 then turns off the electric motor 151 and the pump 150, and closes the solenoid valve 142 accordingly.

Referring now to FIGS. 4 and 5, the auxiliary holding tank 148 can be selected to collect the withdrawn water by pressing the key 48 on the keyboard 45 of the remote controller 34 and the display panel 50 of the remote controller 34 will show "From:User To:Auxiliary Tank". Once the auxiliary holding tank 148 is selected, the solenoid valve 142 will be signaled to close and the solenoid valve 144 signaled to open during the water withdrawal session so that the withdrawn water is directed to and collected in the auxiliary holding tank 148. The withdrawn water in the auxiliary holding tank 148 will automatically drain into the draining outlet 146 when the auxiliary holding tank 148 is full. The withdrawn water collected in the auxiliary holding tank 148 can be used in other applications. For example, the water withdrawn from a bathtub and collected in the auxiliary holding tank 148 can be used for washing vehicles through a hose attached to the outdoor outlet 165, or the water withdrawn from an aquarium and collected in the auxiliary holding tank 148 can be used for watering the potted plants 70. In this situation, the auxiliary holding tank 148 must be selected as a water source which can be done by pressing the key 48 for "User" on the keyboard 45 of the remote controller 34 until the display panel 50 of the remote controller 34 shows "From:Auxiliary Tank To:User". When the auxiliary holding tank 148 is selected as a water source, the main controller unit 152 will open solenoid valve 144 and close other valves when a water supply session is initiated. Thus, the electric motor 151 drives the pump 150 in a direction to pump the water from the auxiliary holding tank 148 through a selected branch of the water distribution net 160 and the flexible water pipe 22 to the plant pot 70.

The pipe sections forming the water distribution net 160 are preferably built within the house structure similar to a central vacuum system. Thus the central water flow and drain system 130 can be conveniently used by connecting the flexible water pipe 22 to an indoor plant pot 70 with any one of the indoor outlets 164 in the house which is close to the plant pot 70. After the water supply and withdrawal procedure to this plant pot 70 is completed, the flexible water pipe 22 is disconnected from this plant pot 70 and can then be connected to the next of the plant pots 70 to be watered (not shown). The flexible water pipe 22 can remain in connection with the same indoor outlet 164 for watering the next plant pot if it is close enough to the same indoor outlet 164, or can be disconnected from that indoor outlet 164 and connected to another indoor outlet 164 which is closer to the next plant pot to be watered, if necessary. For homes or offices where the central water flow and drain system is not practical because the installation cannot be done easily or is not an option, for example, in a rented apartment, a similar system has been developed which can be attached to a tap and sink in a kitchen or washroom.

Figure 8:
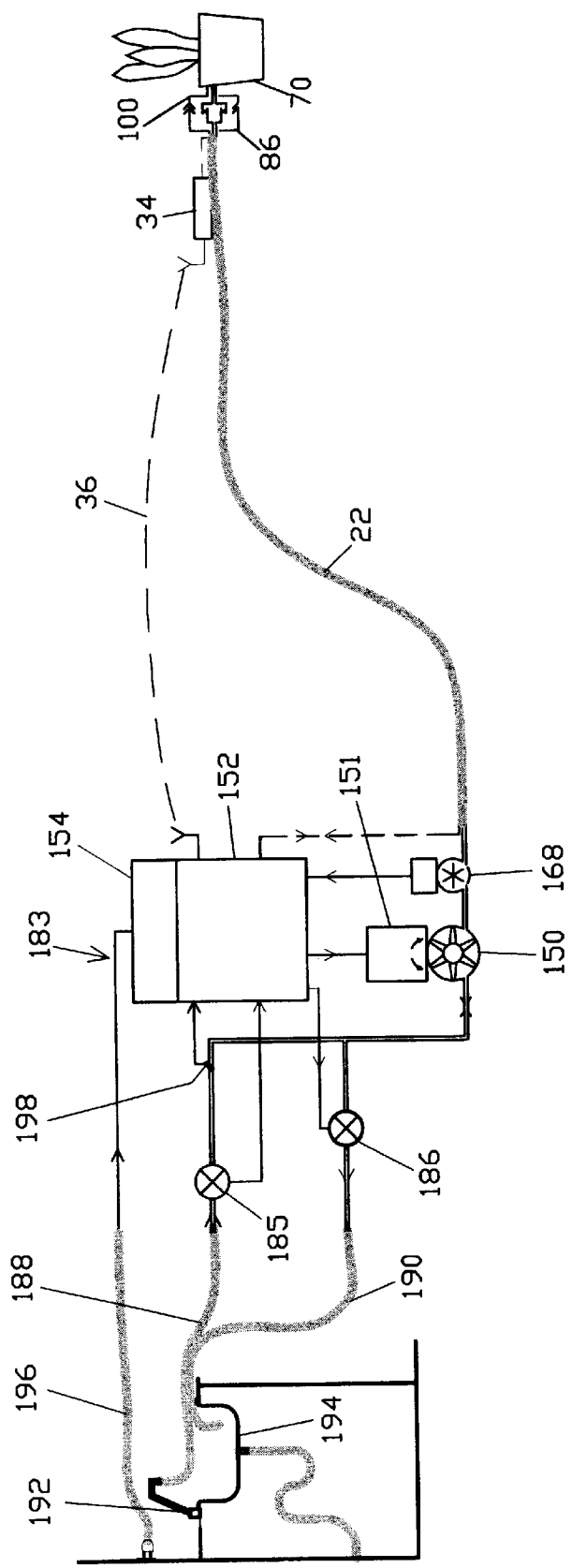
FIG. 8 is a schematic view illustrating an attachable water flow and drain system according to a further embodiment of the present invention.

FIG. 8 illustrates an attachable water flow and drain system 183 which includes a main controller unit 152 with a power supply unit 154 to control a reversible electric motor 151 which is coupled to and is adapted for driving a pump 150. The pump 150 is connected at one port thereof to the flexible water pipe 22 through a water flow meter 168. The flexible water pipe 22 is connected at its other end to a hydro-electrical connector 86 for attachment to, for example, the plant pot 70 through its hydro-electrical socket 100. The remote controller 34 as described with reference to FIG. 4 is attached to the flexible water pipe 22 proximate to the plant pot 70. The pump 150 at its other port is connected to both a proportional solenoid valve 185 and a solenoid valve 186 for selectively establishing fluid communication with either a water supply hose 188 or a water draining hose 190. The water supply hose 188 is adapted to be connected to a conventional water tap 192 and the water draining hose 190 is adapted to be placed into a conventional sink 194. A power cord 196 connected to the power supply unit 154, is provided in order to be connected to a convenient power outlet. The main controller unit 152 is electronically connected to the proportional solenoid valve 185, the solenoid valve 186, the electric motor 151 and the water flow meter 168. The main controller unit 152 is also electronically connected in a wireless manner, with the remote controller 34.

In order to operate the attachable water flow and drain system 183, the tap 192 must be manually turned on to an acceptable water temperature level before the operation can begin. During a water supply session, the proportional solenoid valve 185 is signaled to partially open when a requested flow rate is selected by using the remote controller 34, and then the pump 150 is driven by the electric motor 151 in order to supply water from the water tap 192 through the flexible water pipe 22 to the plant pot 70. The solenoid valve 186 at this stage is signaled to remain closed. The water flow rate is adjusted by controlling the open level of the proportional solenoid valve 185. The water flow volume is measured by the water flow meter 168 and the measured value is displayed on the remote controller 34. A temperature sensor 198 is installed to measure the temperature of the water flowing from the water tap 192 through the flexible water pipe 22 to the plant pot 70. The measured water temperature is also displayed on the remote controller 34 to provide information for manually adjusting the water temperature at the water tap 192. When the water temperature is outside of a pre-determined range, the main controller unit 152 will automatically stop the water supply by signaling the proportional solenoid valve 185 to close and the electric motor 151 to stop, until the water temperature is manually adjusted at the water tap 192, and the water supply session is re-initiated manually at the remote controller 34. The pre-determined water temperature range information is either included in the memory chip 104 of the hydro-electrical socket 100 of FIG. 3, or stored in the file of the main controller 152.

In a water withdrawal session, the proportional solenoid valve 185 is signaled to close and the solenoid 186 is signaled to open. At the same time the electric motor 151 is signaled to run in a direction to drive the pump 150 to withdraw water from the plant pot 70 through the flexible water pipe 22 and the water draining hose 190 into the sink 194. The flow rate of the water withdrawal is monitored by the flow meter 168 and the main controller unit 152 controls the speed of the electric motor 151 for adjusting the flow rate accordingly.

Alternatively, the proportional solenoid valve 185 can be replaced by an ordinary solenoid valve, in which case the flow rate adjustment of the water supply session is controlled by adjusting the speed of the electric motor 151 driving the pump 150. In this case, however, the pump 150 must be of a design such that the pump 150 can accept water from the tap 192 at full tap pressure and completely block the water flow.

Figure 9:
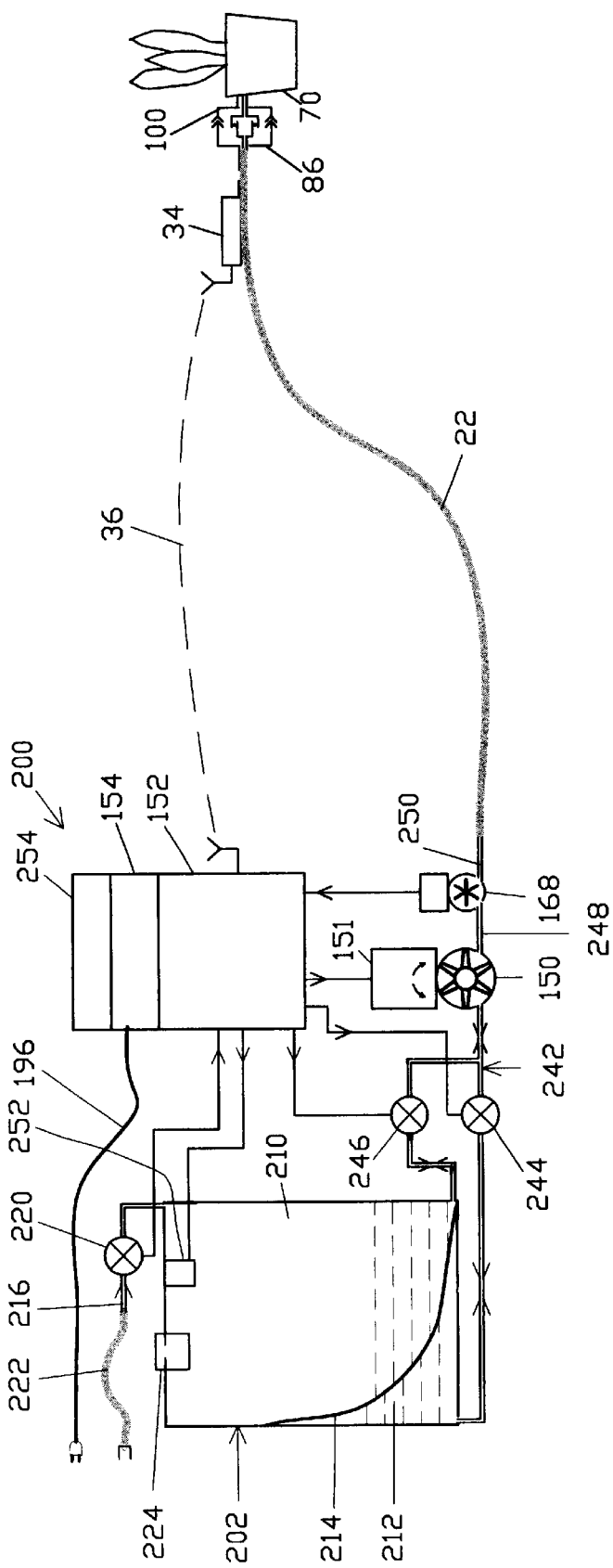
FIG. 9 is a schematic view illustrating a portable water flow and drain system according to a still further embodiment of the present invention.
Figure 10:
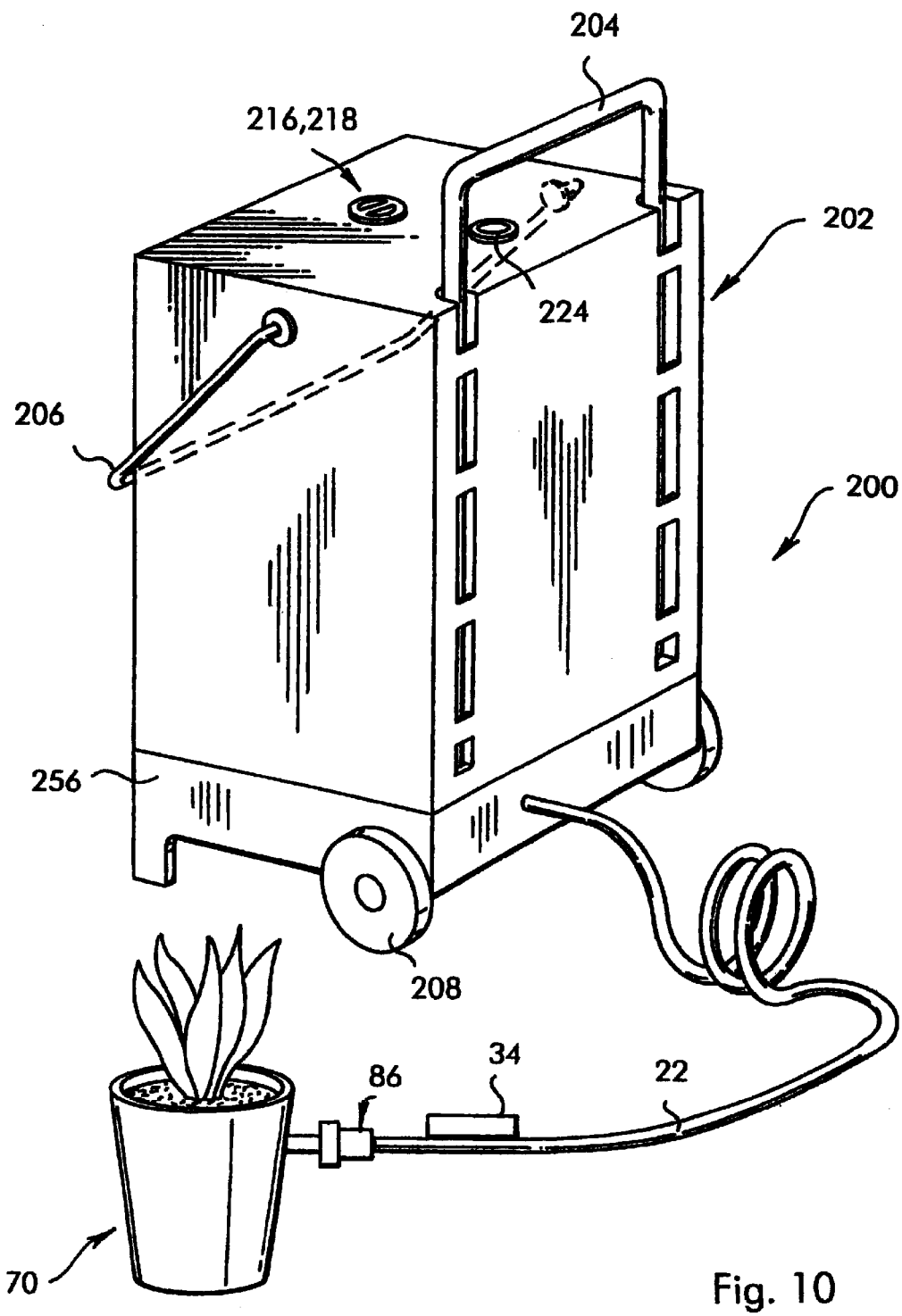
FIG. 10 is a perspective view of the portable water flow and drain system of FIG. 9.

FIGS. 9 and 10 illustrate a portable water flow and drain system, generally indicated at numeral 200, which is particularly advantageous when used for watering plant pots spread out over a large area. However, as a portable water supply and withdrawal device, it is also convenient to use the portable water flow and drain system 200 in a house, office or commercial building, or in an outdoor area for various applications, such as use with an aquarium or a floor cleaning device.

The portable water flow and drain system 200 includes a container 202 with handles 204, 206 and wheels 208 and therefore can be wheeled around and carried for transportation.

The container 202 includes a fresh water compartment 210 and a brown water compartment 212. A flexible diaphragm 214 separates the two compartments 210 and 212. The brown water compartment 212 is positioned relatively lower than the fresh water compartment 210 within the container 202. The flexible diaphragm 214, which is preferably made from Latex, permits the whole container 202 to be completely filled with fresh water during a fill-up session, the containing volume of the brown water compartment 212 being reduced to zero. The brown water compartment 212 can then only be used after a portion of fresh water has been pumped out of the container 202. The maximum size of the brown water compartment 212 comprises only about 25% of the total size of the container 202.

The top of the container 202 is closed except for an opening 216 with a water-tight cap 218. A solenoid valve 220 is provided at the opening 216 within the container 202 for automatically closing the opening 216. A water hose 222 is provided for connection of the opening 216 of the container 220 with, for example, a water tap (not shown). The water hose 222 is provided at one end with a threaded adapter (not indicated) for threadedly connecting to a threaded water tap, and at the other end is provided with an adapter (not shown) which has a similar configuration to that of the water-tight cap 218, so that the water hose 222 can be connected to the opening 216 of the container 202 after the water-tight cap 218 is removed therefrom, during a fill-up session.

Figure 10A:
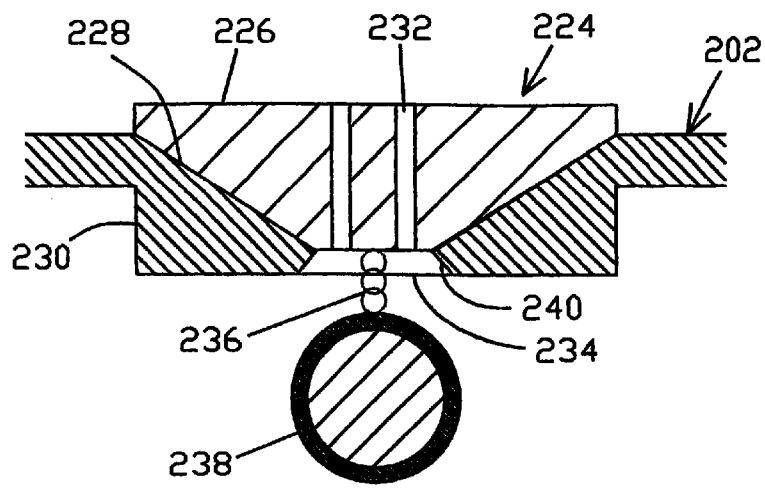
FIG. 10a is a cross-sectional view of a tip safety valve installed in the portable water flow and drain system of FIG. 9, showing a horizontal position thereof.

On the top of the container 202 is a tip safety valve 224. The tip safety valve 224 which is illustrated with technical details in FIGS. 10a and 10b, includes a truncated conical valve body 226 seated on an annular outface 228 of a valve seat 230 positioned in the top of the container 202, as shown in FIG. 10a. The annular outer surface 228 has an angle corresponding to the truncated conical valve body 226 in order to provide a perfect match between the truncated conical valve body 226 and the valve seat 230. The truncated conical valve body 226 is made of heavy metal, such as lead coated with plastic, so that the truncated conical valve body 226 sits stably on the valve seat 230 under it's own weight when the container 202 is upright, as shown in FIG. 10.

Figure 10B:
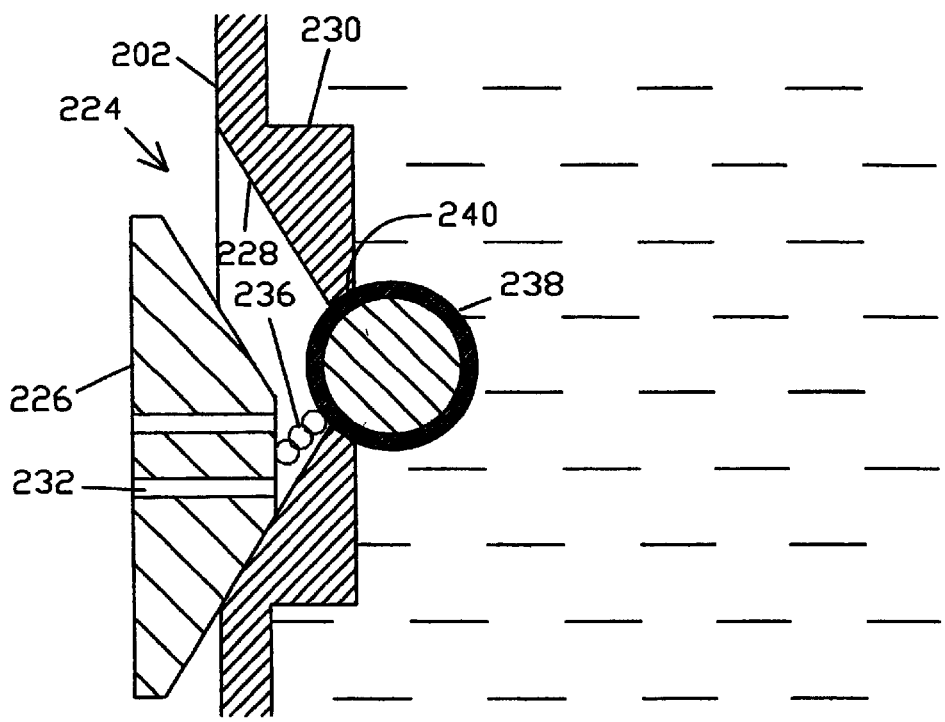
FIG. 10b is a cross-sectional view of the tip safety valve of FIG. 10a, showing a vertical position thereof.

Holes 232 provided in the truncated conical valve body 226, extending therethrough and in fluid communication with a central hole 234 of the valve seat 230, permit air to enter the container 202 when water is pumped out thereof, and also permit air to escape when water is pumped into the container 202. A small chain 236 connects a rubber coated metal ball 238 to the bottom of the valve body 236. In the upright position as shown in FIG. 10a, the ball 238 is suspended by the chain 236 and is spaced apart from the central hole 234 of the valve seat 230, thereby permitting the air to pass through the central hole 234. If the container 202 tips on its side as illustrated in FIG. 10b, the heavy truncated conical valve body 226 slides out of its position, pulling the ball 238 with it to abut an annular inner surface 240 of the valve seat 230, thereby obstructing the central hole 234 in order to inhibit water spillage.

Referring again to FIG. 9, the compartments 210 and 212 are connected through a pipe and valve system 242, to the pump 150 which is coupled with and driven by the reversible electric motor 151. The pipe and valve system 242 includes a solenoid valve 244 which establishes fluid communication between the brown water compartment 212 and the pump 150 when the solenoid valve 244 is opened, and further includes a solenoid valve 246 which establishes fluid communication between the fresh water compartment 210 and the pump 150 when the solenoid valve 246 is open.

On the other side of the pump 150, pipe sections 248 and 250 connect the pump 150, the water flow meter 168 and one end of the flexible water pipe 22, in series. The hydro-electrical connector 86 connected to the other end of the flexible water pipe 22 is adapted to connect with the hydro-electrical socket 100 of a user apparatus, for example, the plant pot 70. The remote controller 34 attached to the flexible water pipe 22 proximate to the plant pot 70 is in wireless communication with the main controller unit 152. The main controller unit 152 is electronically connected to the solenoid valves 220, 244 and 246, the electric motor 151 and the water flow meter 168. The main controller unit 152 is also connected to a water level sensor 252 which is positioned at the top of and within the container 202. The portable water flow and drain system 200 further includes a rechargeable battery 254 in addition to the power supply unit 154 which has a power cord 196 adapted to be connected to an electrical power outlet (not shown).

With reference to both FIGS. 9 and 10, the container 202 has a bottom compartment 256, in addition to and separate from the fresh and brown water compartments 210, 212, to house the pipe and valve system 242, pump 150, electric motor 151, the water flow meter 168 and the pipe sections 248, 250. The bottom compartment 256 preferably has an open bottom with necessary support structures to secure those components therein. The main controller unit 152, power supply unit 154 and the rechargeable battery 254 are also supported within the bottom compartment 256.

The portable water flow and drain system 200 must be filled with water before being used. The fresh water compartment 210 of the container 202 can be filled in two different ways. When the fresh water compartment 202 is to be filled with water supplied from a water tap (not shown), the water hose 222 at one end is attached to the water tap and at the other end is connected to the opening 216 of the container 210 after the water-tight cap 118 has been removed therefrom. The solenoid valve 246 is closed and the solenoid valve 220 is open. The tap is then manually turned on and the temperature is adjusted for the application. The temperature of the water in the fresh water compartment 210 can be measured, if desired by means of a temperature sensor (not shown) positioned within the fresh water compartment 210, and this measurement can be displayed on the remote controller 34. The water level sensor 252 sends a signal to the main controller unit 152 when the fresh water compartment 210 is full. In response to the water-full signal the main controller unit 152 automatically signals the solenoid valve 220 to close. After the fresh water compartment 210 is full the water hose 222 is manually detached from the opening 216 of the container 202 and then the water-tight cap 218 is tightly engaged in the opening 216. The power cord 192 is also manually detached from an electrical power outlet if it is connected thereto during the water fill-up session. The portable water flow and drain system 200 is then ready to be moved close to the location of the plant pot 70, in order to perform a water supply and withdrawal operation. The water supply and withdrawal operation for watering the plant is similar to those described with reference to FIGS. 1, 3, 4, 5 and 8, and therefore will not be redundantly described herein.

When the fresh water compartment 210 is filled with water from a pail, bathtub or other kind of container, the flexible water pipe 22 can be used to withdraw the water from such a container and deliver the water into the fresh water compartment 210. In this fill-up operation, the main controller unit 152 signals the electric motor 151 to drive the pump 150 in a direction to withdraw water from such a container as a water source through the flexible water pipe 22, while signaling solenoid valve 246 to open and solenoid valve 244 to close so that the withdrawn water is delivered into the fresh water compartment 210 instead of the brown water compartment 212. The latter is a usual case in a water withdrawal session of a normal water supply and withdrawal operation of the system 200. It is also noted that the end of the flexible water pipe 22 attached with the hydro-electrical connector 86 is not suggested to be directly placed into water during this type of fill-up session because the metal contacts in the hydro-electrical connector 86 may be damaged by water. It is suggested that an additional pipe section which can be properly connected to the end of the flexible water pipe 22 attached with hydro-electrical connector 86, should be used as an extension of the flexible water pipe 22, to be placed without fear of damage into the water of a water source container.

Once the fresh water compartment 210 is filled, the portable water flow and drain system 200 can be carried or wheeled around. The portable water flow and drain system 200 generally works similarly to the central water flow and drain system 130 as illustrated in FIG. 5. When the brown water compartment 212 is full after a water withdrawal session of a water supply and withdrawal operation, unlike the system 230 in FIG. 5 in which the excess withdrawn water collected in the auxiliary holding tank 148 automatically drains, the main controller unit 152 of the system 200 as shown in FIG. 9, signals the solenoid valve 244 to open and controls the electric motor 151 to drive the pump 150 in a direction to pump the withdrawn water out of the brown water compartment 212 and through the flexible water pipe 22 the end of which is placed at a drain inlet.

Modifications and improvements to the above-described embodiment of the present invention may become apparent to those skilled in the art. The foregoing description is intended to be exemplary rather than limiting. The scope of the invention is therefore intended to be limited solely by the scope of the appended claims.

I claim:

1. A system for supplying and withdrawing water comprising:
    a water passage having a first end adapted for use selectively with an external apparatus separable from the system;
    means connected with a second end of the water passage for generating a fluid pressure differential in two modes in the water passage between the first and second ends thereof;
    means for selectively establishing water communication of the water passage with a water source, or with a place of water drainage, the means for establishing water communication being connected with the means for generating a fluid pressure differential, in order to supply water to the apparatus through the water passage, or to withdraw water from the apparatus and deliver the withdrawn water to the place of water drainage through the water passage, during different periods of time; and
    a main controller associated with the means for generating a fluid pressure differential and with the means for selectively establishing water communications, the main controller controlling the operation of water supply and withdrawal.

2. A system as claimed in claim 1 further comprising a remote controller for sending controlling signals to the main controller.

3. A system as claimed in claim 1 further comprising means for releasably connecting the first end of the water passage to the apparatus in fluid communication.

4. A system as claimed in claim 3 further comprising signal conductors, each signal conductor being adapted at a first end thereof for receiving signals from sensors associated with the apparatus, and being connected at a second end thereof to the main controller for transmitting the signals thereto.

5. A system as claimed in claim 2 wherein the signal conductors comprise wires incorporated into a pipe wall defining at least one section of the water passage.

6. A system as claimed in claim 5 wherein the at least one section of the water passage comprises a flexible water pipe having first and second ends thereof, the first end of the water pipe defining the first end of the water passage.

7. A system as claimed in claim 6 further comprising a connector having a first part connected to the second end of the flexible water pipe and a second part connected to a section of the water passage, for releasably connecting the flexible water pipe to the section of the water passage in fluid communication.

8. A system as claimed in claim 7 wherein the connector comprises metal contacts at the respective parts thereof for detachably connecting the wires incorporated into the pipe wall with the wires connected to the main controller.

9. A system as claimed in claim 6 further comprising a plurality of water pipe sections connected together forming a water distribution net, the water distribution net having one opening defining the second end of the water passage, and a plurality of other openings to be selectively connected to the flexible water pipe so that a branch of the water distribution net between the one opening defining the second end of the water passage and the selected opening connected with the flexible pipe, together with the flexible pipe, defines the water passage when the remaining openings of the water distribution net are closed.

10. A system as claimed in claim 9 further comprising a plurality of cover members for closing the respective remaining openings of the water distribution net.

11. A system as claimed in claim 10 wherein each cover member comprises a indicator of system working status.

12. A system as claimed in claim 6 wherein the connecting means comprises:
   a first part connected to the first end of the water pipe;
   a second part adapted to be connected to the apparatus;
   a memory chip attached to the second part for storing operation data with respect to the apparatus; and
   a plurality of metal contacts affixed to the respective first and second parts for conducting signals from the apparatus and the memory chip through the wires incorporated in the pipe wall, to the main controller.

13. A device for supplying and withdrawing water comprising:
   a container including a first compartment for containing source water and a second compartment for collecting withdrawn water;
   a reversible pump adapted to be in selective fluid communication with one of the first and second compartments; a reversible electric motor coupled with the pump;
   a pipe having a first end connected to the pump and a second end adapted for use selectively with an external apparatus separable from the device;
   means for controlling the selective fluid communication of the pump with one of the first and second compartments, and for controlling the electric motor in operation, thereby the electric motor driving the pump in either direction as required, in order to either supply source water from the first compartment to the apparatus, or to withdraw water from the apparatus and deliver the withdrawn water into the second compartment through the pipe.

14. A device as claimed in claim 13 further comprising a valve and pipe system wherein a first solenoid valve is connected between the pump and the first compartment and a second solenoid valve is connected between the pump and the second compartment, the two solenoid valves being controlled by the controlling means for the selective connection of the pump to either one of the first and second compartments.

15. A device as claimed in claim 13 wherein the first and second compartments are separated by a flexible diaphragm.

16. A device as claimed in claim 13 wherein the device is made in a portable style and the container comprises a tip safety valve permitting air to pass therethrough while inhibiting water spillage when the container tips to one side.

17. A device as claimed in claim 13 wherein the pipe comprises a valve attached to the second end thereof in order to inhibit water spillage when the second end of the pipe is detached from the apparatus.

18. A device as claimed in claim 13 wherein the pipe comprises a connector attached to the second end thereof for selectively connecting the external apparatus.

* * * * *